United States Patent
Kabe et al.

(10) Patent No.: US 12,222,360 B2
(45) Date of Patent: Feb. 11, 2025

(54) AUTOMATIC ANALYZER WITH NOZZLE CONNECTED TO FLOW CELL DETECTOR AND A NOZZLE CLEANING TANK

(71) Applicant: Hitachi High-Tech Corporation, Tokyo (JP)

(72) Inventors: Yoshihiro Kabe, Tokyo (JP); Takenori Okusa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 785 days.

(21) Appl. No.: 17/603,725

(22) PCT Filed: Feb. 26, 2020

(86) PCT No.: PCT/JP2020/007629
§ 371 (c)(1),
(2) Date: Oct. 14, 2021

(87) PCT Pub. No.: WO2020/230403
PCT Pub. Date: Nov. 19, 2020

(65) Prior Publication Data
US 2022/0196695 A1    Jun. 23, 2022

(30) Foreign Application Priority Data
May 15, 2019   (JP) .................................. 2019-091875

(51) Int. Cl.
*G01N 35/10* (2006.01)
*G01N 35/00* (2006.01)
(Continued)

(52) U.S. Cl.
CPC ... *G01N 35/1004* (2013.01); *G01N 35/00712* (2013.01); *G01N 35/025* (2013.01); *G01N 35/08* (2013.01); *G01N 2035/0437* (2013.01)

(58) Field of Classification Search
CPC .. G01N 35/10; G01N 35/08; G01N 35/00712; G01N 35/1004;
(Continued)

(56) References Cited

U.S. PATENT DOCUMENTS 4,052,161 A * 10/1977 Atwood ............... G01N 35/026
                                                        422/82
4,981,801 A *  1/1991 Suzuki ...................... B01L 7/52
                                                        422/67
(Continued)

FOREIGN PATENT DOCUMENTS

JP   2004-223352 A   8/2004
JP   2017-009299 A   1/2017
(Continued)

OTHER PUBLICATIONS

International Search Report of PCT/JP2020/007629 dated Apr. 28, 2020.

*Primary Examiner* — Arlen Soderquist
(74) *Attorney, Agent, or Firm* — MATTINGLY & MALUR, PC (57) ABSTRACT

An automatic analyzer includes a flow cell detector, a nozzle that is connected to the flow cell detector by a flow path and aspirates or discharges liquid, a reservoir that is provided with a table and a table driving mechanism that rotates or moves the table up and down, and a cleaning tank that is disposed on the table. A position of the nozzle is fixed, and a cleaning water discharge port discharges cleaning water used for cleaning the nozzle at an angle φ with respect to a plane perpendicular to a central axis of the nozzle. An upper part of a side wall of the cleaning tank is continuous with an upper discharge unit at a side facing a discharge outlet provided in the reservoir and a spatula-shaped part projects outward of the cleaning tank at a side facing the upper discharge unit.

13 Claims, 7 Drawing Sheets

(51) Int. Cl.
*G01N 35/02* (2006.01)
*G01N 35/08* (2006.01)
*G01N 35/04* (2006.01)

(58) Field of Classification Search
CPC ........... G01N 35/00584; G01N 35/025; G01N 2035/1062; G01N 2035/0443; G01N 2035/0413; G01N 2035/0437; G01N 35/026; G01N 35/02; G01N 35/1002; B01L 3/508; B01L 2300/0858; B01L 2200/06; B01L 2300/0851
USPC ..... 422/63–67, 81–82; 436/43–54, 164–165, 436/180
See application file for complete search history.

(56) References Cited

U.S. PATENT DOCUMENTS

| | | | | |
|---|---|---|---|---|
| 8,802,032 B2* | 8/2014 | Yamashita | ....... | G01N 35/00693 422/524 |
| 9,791,465 B2* | 10/2017 | Sakashita | ......... | G01N 35/00584 |
| 9,977,041 B2* | 5/2018 | Yamashita | ......... | G01N 35/0098 |
| 10,753,953 B2* | 8/2020 | Kuroda | ............... | G01N 35/1004 |
| 11,467,174 B2* | 10/2022 | Kabe | ....................... | G01N 35/08 |
| 2011/0300021 A1* | 12/2011 | Sakairi | ............... | G01N 33/5302 422/69 |
| 2012/0251391 A1* | 10/2012 | Hagiwara | ........ | G01N 35/00722 422/68.1 |
| 2015/0037214 A1 | 2/2015 | Sakashita et al. | | |
| 2015/0293135 A1* | 10/2015 | Yamashita | ......... | G01N 35/0098 422/68.1 |
| 2018/0011121 A1 | 1/2018 | Kuroda et al. | | |
| 2019/0145997 A1 | 5/2019 | Kabe et al. | | |

FOREIGN PATENT DOCUMENTS

| | | |
|---|---|---|
| WO | 2013/125536 A1 | 8/2013 |
| WO | 2016/136290 A1 | 9/2016 |
| WO | 2017/168973 A1 | 10/2017 |

* cited by examiner

AUTOMATIC ANALYZER WITH NOZZLE CONNECTED TO FLOW CELL DETECTOR AND A NOZZLE CLEANING TANK

TECHNICAL FIELD

The present invention relates to an automatic analyzer.

BACKGROUND ART

In an automatic analyzer that performs qualitative and quantitative analysis of a specific component in a biological sample such as blood or urine, there being a detector in which a flow cell detector is installed. The flow cell detector aspirates reaction liquid obtained by reacting a sample with a reagent into a flow cell via an aspiration nozzle, and detects a specific biological component, a chemical substance, and the like contained in the aspirated reaction liquid by a detector.

It is desirable that the aspiration nozzle of the flow cell detector is always fixed at a fixed position. When a mechanism that rotates or moves the aspiration nozzle up and down is provided, vibration of the mechanism may be transmitted to a flow path of the flow cell detector via the aspiration nozzle, and detection accuracy of the detector may be reduced. Further, as the aspiration nozzle is rotated or moved up and down, a length of the flow path to the flow cell is increased, so that overhead required for the aspiration is increased, and an analysis cycle time may be increased.

PTL 1 discloses an automatic analyzer including a detection unit to which an aspiration nozzle of a flow cell detector is fixed. In PTL 1, a liquid transport mechanism that holds various kinds of liquid such as reaction liquid, reaction assisting liquid, and cleaning liquid is provided. The liquid transport mechanism includes a container holding member that holds the various kinds of liquid, and a driving mechanism that rotates or moves the container holding member up and down. The driving mechanism rotates and moves the container holding member up and down, so that the aspiration nozzle fixed to the detector can be inserted into and removed from a container containing predetermined liquid.

CITATION LIST

Patent Literature

PTL 1: WO2013/125536

SUMMARY OF INVENTION

Technical Problem

The container holding member of the liquid transport mechanism of PTL 1 is disposed with a reaction assisting liquid container that stores the reaction assisting liquid, a cleaning liquid container that stores the cleaning liquid, a cleaning tank that cleans the aspiration nozzle, and the like. Correspondingly, a reaction assisting liquid pipe that supplies the reaction assisting liquid and a cleaning liquid pipe that supplies the cleaning liquid are provided, and these pipes are held by the container holding member and the driving mechanism. Accordingly, even when the container holding member rotates or moves up and down, a positional relationship between the pipe and the corresponding container or the cleaning tank is maintained.

However, when flow paths for supplying the various kinds of liquid are built in a movable portion of the liquid transport mechanism in this way, an arrangement of the flow paths is complicated, which leads to complication of the mechanism and an increase in cost. Therefore, the flow paths are not built in the liquid transport mechanism, but are fixed above the container holding member. That is, the pipes and discharge ports for supplying the various kinds of liquid are always fixed, and the liquid transport mechanism receives the supply of the various kinds of liquid by rotating or moving the container holding member up and down with respect to the discharge port.

In this configuration, while a structure of the liquid transport mechanism can be simplified, a structure of the cleaning tank is also simplified, and it is difficult to specially provide a mechanism for sufficiently cleaning the aspiration nozzle, such as providing a plurality of discharge ports in the cleaning tank. Even in the cleaning tank having the simplified structure, it is necessary to appropriately clean the aspiration nozzle.

Solution to Problem

The automatic analyzer as an embodiment of the invention includes a flow cell detector, a nozzle that is connected to the flow cell detector by a flow path and aspirates or discharges liquid, a reservoir that is provided with a table and a table driving mechanism that rotates the table or moves the table up and down, and a cleaning tank that is disposed on the table. A position of the nozzle is fixed, and a cleaning water discharge port that discharges cleaning water used for cleaning the nozzle is fixed such that the cleaning water can be discharged at an angle $\varphi$ with respect to a plane perpendicular to a central axis of the nozzle, and an upper part of a side wall of the cleaning tank is continuous with an upper discharge unit at a side facing a discharge outlet provided in the reservoir and a spatula-shaped part that projects outward the cleaning tank at a side facing the upper discharge unit.

Advantageous Effect

Even in a simple cleaning mechanism, cleaning of the nozzle is performed with high reliability.

Other technical problems and novel characteristics will become apparent from a description of the present specification and the accompanying drawings.

DESCRIPTION OF EMBODIMENTS

Figure 1:
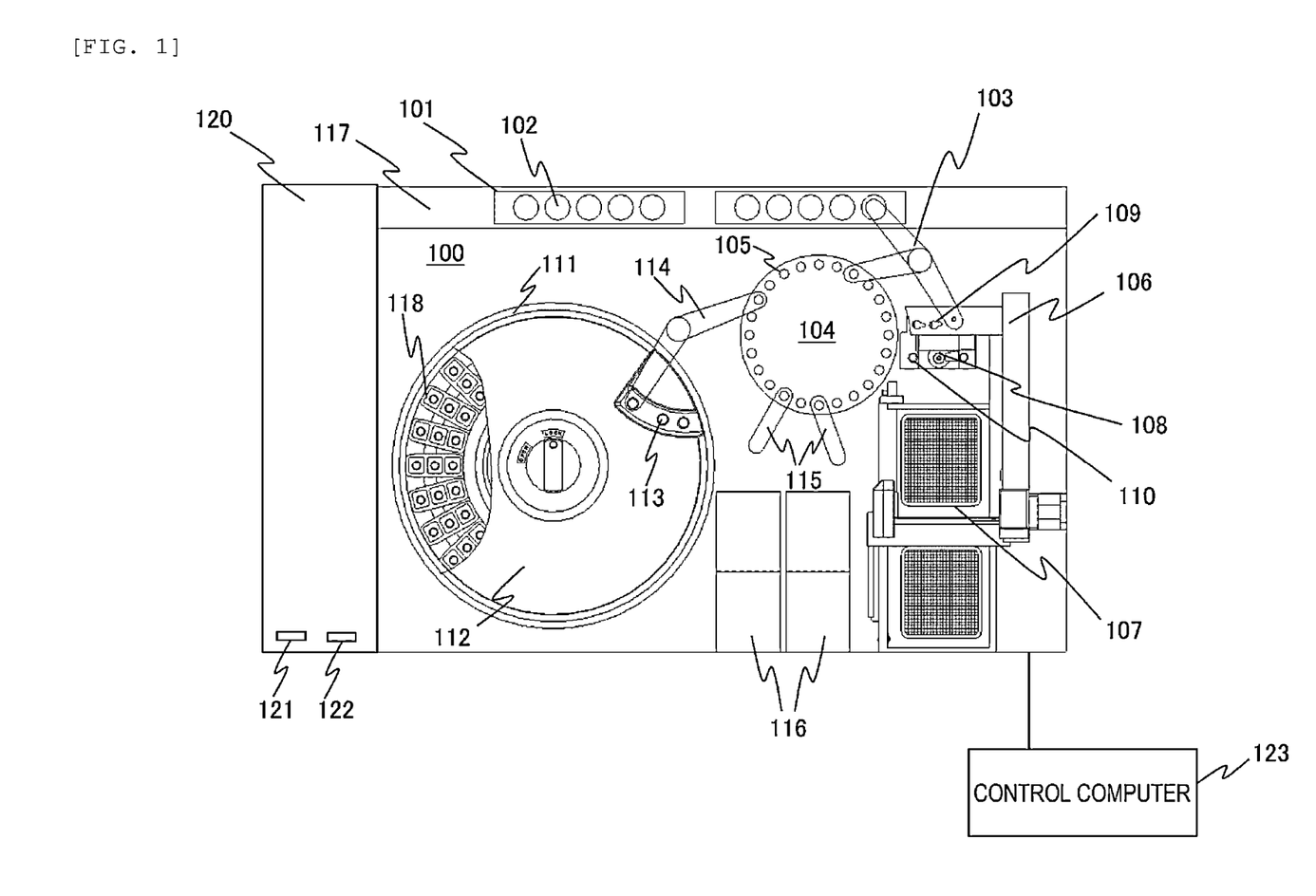
FIG. 1 is an overall configuration diagram of an automatic analyzer.

FIG. 1 shows an overall configuration of an automatic analyzer according to the present embodiment.

An analyzer 100 is connected to a rack transport unit 120 that stores racks 101, and the rack transport unit 120 includes a power-on instruction unit 121 and a power-off instruction unit 122 of the automatic analyzer. The power-on instruction unit 121 and the power-off instruction unit 122 are buttons that can be input by an operator. A display unit of a control computer 123 that controls an operation of each mechanism of the automatic analyzer may include an input unit that instructs power-on or power-off. The rack 101 is provided with sample containers 102 each holding a sample, and the rack 101 is moved to a sample dispensing position in the vicinity of a sample dispensing nozzle 103 by a rack transport line 117. A plurality of reaction vessels 105 can be installed in an incubator 104, and each of the reaction vessels 105 installed in a circumferential shape is moved to a predetermined position by a rotational motion.

A transport mechanism 106 is movable in three directions of an X axis, a Y axis, and a Z axis, moves in a range of predetermined places of a holding member 107, a reaction vessel stirring mechanism 108, a waste hole 109, a sample dispensing tip mounting position 110, and the incubator 104, and transports a sample dispensing tip or the reaction vessel.

A plurality of unused reaction vessels and unused sample dispensing tips are installed in the holding member 107. The transport mechanism 106 moves to above the holding member 107, moves downward to grip the unused reaction vessel, then moves upward, moves to above a predetermined position of the incubator 104, and moves downward to install the reaction vessel 105. Next, the transport mechanism 106 moves to above the holding member 107, moves downward to grip the unused sample dispensing tip, then moves upward, moves to above the sample dispensing tip mounting position 110, and moves downward to install the sample dispensing tip.

The sample dispensing nozzle 103 can rotationally move and move up and down, and after rotationally moving to above the sample dispensing tip mounting position 110, the sample dispensing nozzle 103 moves downward, and the sample dispensing tip is press-fitted and mounted on a distal end of the sample dispensing nozzle 103. The sample dispensing nozzle 103 on which the sample dispensing tip is mounted moves to above the sample container 102 placed on the rack 101, and then moves downward to aspirate a predetermined amount of the sample held in the sample container 102. The sample dispensing nozzle 103 that aspirates the sample moves to above the incubator 104, and then moves downward to discharge the sample to the unused reaction vessel 105 held in the incubator 104. When the sample discharge is completed, the sample dispensing nozzle 103 moves to above the waste hole 109, and discards the used sample dispensing tip from the waste hole 109.

A plurality of reagent containers 118 are installed in a reagent disk 111. A reagent disk cover 112 is provided at an upper part of the reagent disk 111, and an inside of the reagent disk 111 is kept at a predetermined temperature. A reagent disk cover opening 113 is provided in a part of the reagent disk cover 112. A reagent dispensing nozzle 114 can rotationally move and move up and down, moves downward after rotationally moving to above the opening 113 of the reagent disk cover 112 to immerse a distal end of the reagent dispensing nozzle 114 in a reagent in the predetermined reagent container and aspirate a predetermined amount of the reagent. Next, after the reagent dispensing nozzle 114 moves upward, the reagent dispensing nozzle 114 rotationally moves to above a predetermined position of the incubator 104 to discharge the reagent into the reaction vessel 105.

The reaction vessel 105 into which the sample and the reagent are discharged moves to a predetermined position by the rotation of the incubator 104, and is transported to the reaction vessel stirring mechanism 108 by the transport mechanism 106. The reaction vessel stirring mechanism 108 stirs and mixes the sample and the reagent in the reaction vessel by applying the rotational motion to the reaction vessel. The reaction vessel 105 in which the stir is completed returns to the predetermined position of the incubator 104 by the transport mechanism 106.

A reaction vessel transport mechanism 115 that transfers the reaction vessel 105 between the incubator 104 and a detection unit 116 grips and raises the reaction vessel 105 on the incubator 104, and transports the reaction vessel 105 to the detection unit 116 by the rotational movement. The reaction vessel 105 is analyzed by the detection unit 116. The reaction vessel 105 from which reaction liquid is aspirated in the detection unit 116 returns to the incubator 104 again by the reaction vessel transport mechanism 115, and moves to the predetermined position by the rotation of the incubator 104. The transport mechanism 106 moves to above the reaction vessel in which the aspiration is completed from the incubator 104, moves downward to grip the reaction vessel in which the aspiration is completed, then moves upward to above the waste hole 109, and discards the reaction vessel in which the aspiration is completed from the waste hole.

Figure 2A:
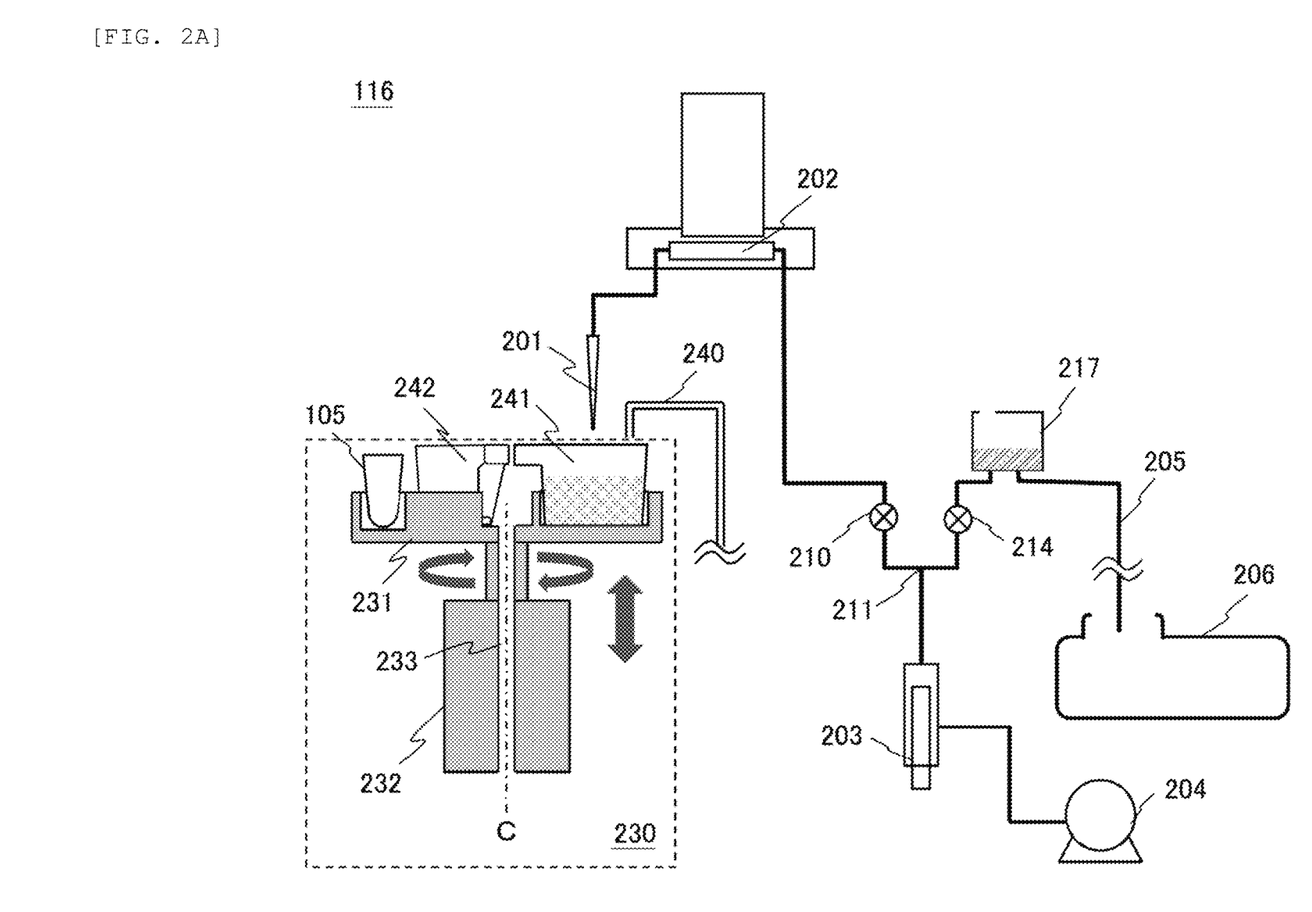
FIG. 2A is a schematic configuration diagram of a flow cell detector and peripheral mechanisms.

FIG. 2A shows a schematic configuration of a flow cell detector of the detection unit 116 and peripheral mechanisms thereof. The detection unit 116 includes, as a main structure, an aspiration nozzle 201 through which various kinds of liquid are aspirated or discharged, a flow cell detector 202 for detecting an object to be measured, a syringe 203 for generating a pressure difference for aspirating or discharging the various kinds of liquid, a system water supply pump 204 connected to the syringe 203, a drain flow path 205 for discharging liquid and the like, and a drain tank 206 for storing and periodically replacing the discharged liquid, and these are connected by a flow path. The aspiration nozzle 201 is connected to an inlet of the flow cell detector 202, and an outlet of the flow cell detector 202 is connected to a branching unit 211 connected to the syringe 203 via a first valve 210. The branch unit 211 is connected to the drain flow path 205 via a second valve 214, and an atmosphere opening part 217 is provided between the second valve 214 and the drain flow path 205.

The aspiration nozzle 201 is always fixed at a fixed position. Therefore, a reservoir 230 for transporting various kinds of liquid containers aspirated by the aspiration nozzle 201 to an aspiration position of the aspiration nozzle 201 is installed below the aspiration nozzle 201.

The reservoir 230 includes a table 231 and a table driving mechanism 232 that drives the table 231 and holds the table 231 at a specific position. The table driving mechanism 232 rotates the table 231 about a central axis C or moves the table 231 up and down. The table 231 is provided with the reaction vessel 105, a liquid container 241 that stores the liquid (reaction assisting liquid and the like) aspirated by the aspiration nozzle 201, and a cleaning tank 242 that cleans the aspiration nozzle 201. Details will be described later, and the liquid container 241 or the cleaning tank 242 includes a discharge unit for discharging the liquid by causing the liquid to overflow. The liquid overflowed from the discharge unit of the liquid container 241 or the cleaning tank 242 is discharged from a discharge outlet through a flow path 233 provided along the central axis C of the table driving mechanism 232.

A supply port 240 through which the various kinds of liquid (for example, a diluent, cleaning liquid, the reagent, and system water) are supplied to the liquid container 241 and the cleaning tank 242 is provided at a fixed position. Although simplified in FIG. 2, a plurality of liquid containers 241 can be arranged on the table 231. A plurality of supply ports 240 are also provided. Therefore, the reservoir 230 drives the table 231 by the table driving mechanism 232 and holds the table 231 at the specific position, thereby performing the supply of the various kinds of liquid to the liquid container 241, the aspiration or the discharge by the aspiration nozzle 201, and the cleaning of the aspiration nozzle 201.

Figure 2B:
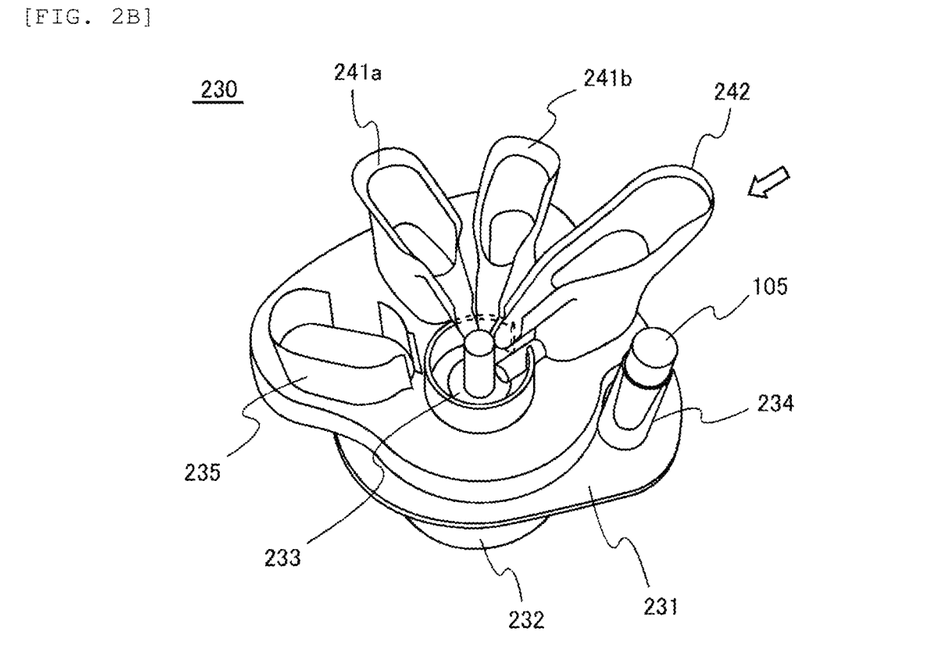
FIG. 2B is a perspective view of (a part of) a reservoir.

FIG. 2B is a perspective view of (a part of) the reservoir 230. A reaction vessel holding unit 234 is provided on the table 231, and the reaction vessel 105 is placed on the reaction vessel holding unit 234. Further, two liquid containers 241a and 241b and the cleaning tank 242 are disposed on the table 231. Each of the liquid containers 241 and the cleaning tank 242 is a container made of a resin, and is detachably placed at a predetermined position of the table 231. Further, the table 231 is provided with a special cleaning liquid container installation unit 235. Special cleaning liquid is cleaning liquid used for cleaning the flow cell detector 202 at a time of maintenance, and a special cleaning liquid container can be placed at a position when the special cleaning liquid is used.

Hereinafter, cleaning operation of the aspiration nozzle 201 will be described with reference to FIGS. 3 to 7.

Figure 3:
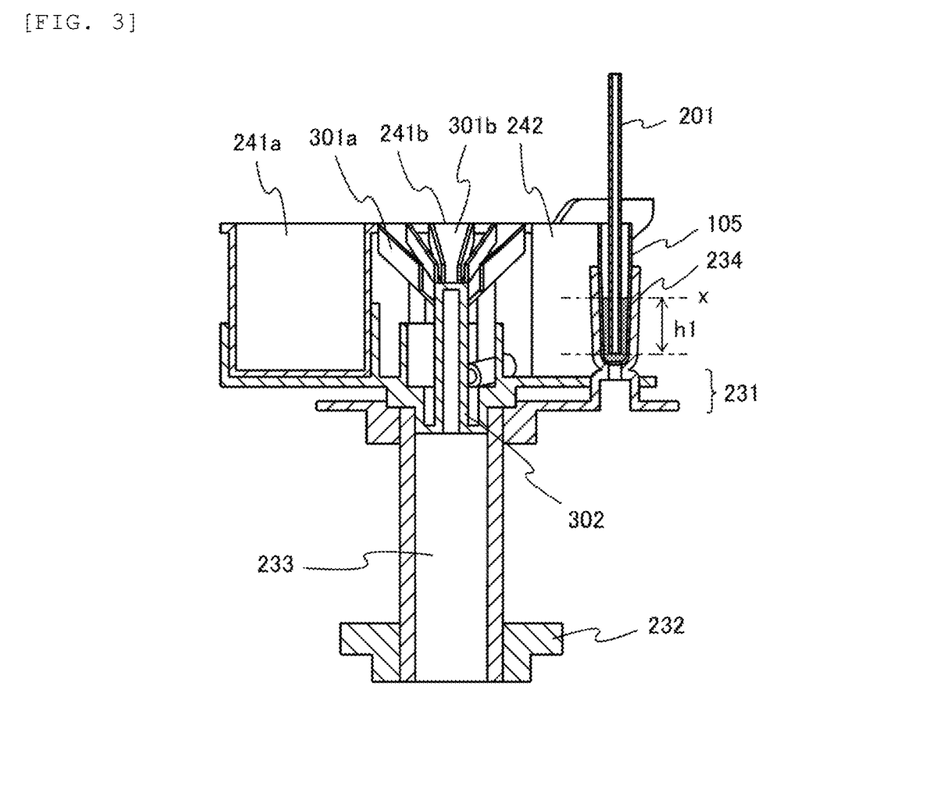
FIG. 3 is a diagram showing cleaning operation of an aspiration nozzle.

FIG. 3 shows a state in which the aspiration nozzle 201 aspirates the reaction liquid from the reaction vessel 105. In a state in which the reaction vessel 105 is placed on the reaction vessel holding unit 234 of the table 231, the reservoir 230 rotates the table 231 to transport the reaction vessel 105 to a lower part of the aspiration nozzle 201, and moves the table 231 upward to immerse the aspiration nozzle 201 in the reaction vessel 105. FIG. 3 shows this state. In this state, by operating the syringe 203, the reaction liquid is aspirated from the aspiration nozzle 201, and the reaction liquid is fed to the detector. When the aspiration nozzle 201 aspirates the reaction liquid, the aspiration nozzle 201 comes into contact with the reaction liquid up to a position x. Therefore, it is necessary to clean the aspiration nozzle 201 up to a range of a height h1 from the lower end of the aspiration nozzle to the position x.

Here, a structure around the discharge outlet of the reservoir through which the liquid discharged from the liquid container 241 and the cleaning tank 242 is discharged will be supplemented with reference to FIG. 3. As described above, each of the liquid containers 241 includes a discharge unit 301, and unnecessary liquid is discharged from the discharge unit 301 to the flow path 233 by causing the unnecessary liquid to overflow. The discharge unit 301 is provided so as to be continuous with an upper part of a side wall of the liquid container 241. In order to prevent scattering of the overflowed discharged liquid, a cylindrical member 302 is provided so as to face the discharge unit 301, and the overflowed waste liquid flows into the flow path 233 through the cylindrical member 302. The cleaning tank 242 has substantially the same structure and will be described later.

Figure 4:
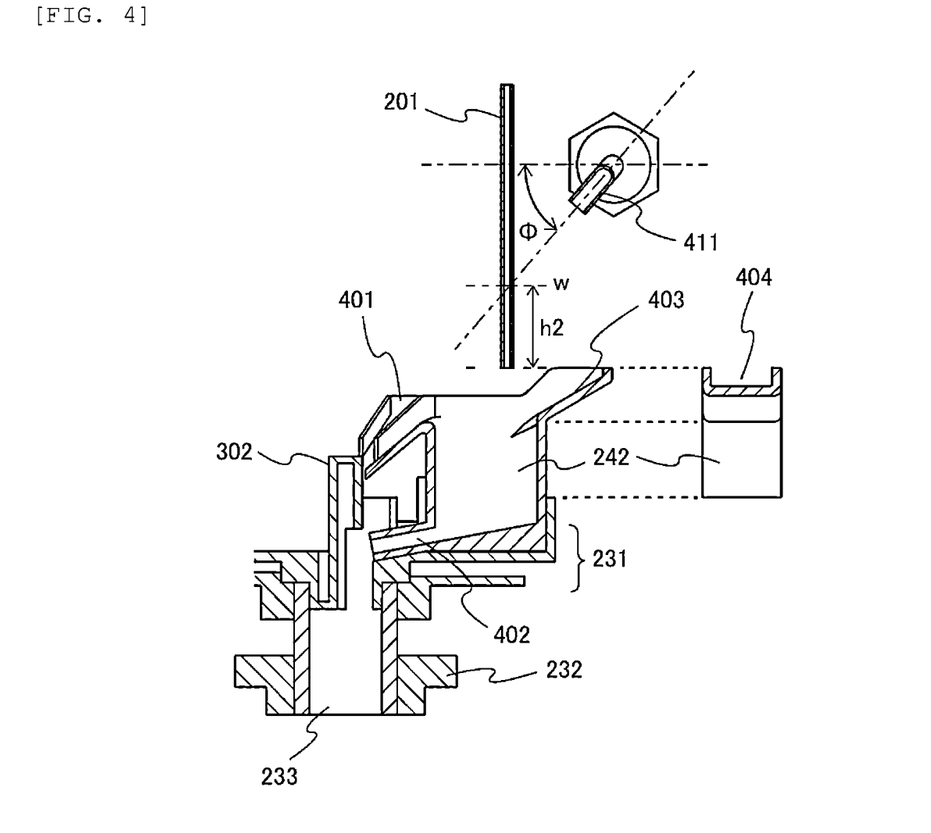
FIG. 4 is a diagram showing the cleaning operation of the aspiration nozzle.

FIG. 4 shows a state in which the reservoir 230 rotates the table 231 and transports the cleaning tank 242 to the lower part of the aspiration nozzle 201. FIG. 4 shows a cleaning water discharge port 411 through which cleaning water (system water, pure water) is discharged to the cleaning tank 242 together with the aspiration nozzle 201. Both the aspiration nozzle 201 and the cleaning water discharge port 411 are fixedly arranged, and a positional relationship between the aspiration nozzle 201 and the cleaning water discharge port 411 does not change. An angle at which the cleaning water is discharged to the aspiration nozzle 201 with respect to a plane perpendicular to the central axis of the aspiration nozzle 201 is defined as φ. The control computer causes the reservoir 230 to raise the cleaning tank 242 to a predetermined position while causing the cleaning water discharge port 411 to discharge the cleaning water at the angle φ. A timing at which the discharge of the cleaning water is started may be after the table 231 is raised, and in order to shorten a time required for the cleaning, the discharge of the cleaning water is started as early as possible as long as the cleaning water does not scatter beyond the cleaning tank 242. The cleaning water discharged from the cleaning water discharge port 411 intersects with the aspiration nozzle 201 at a position w (that is, the position w is an intersection point between the aspiration nozzle 201 and an imaginary line extending from the cleaning water discharge port 411 at the angle φ with respect to the plane perpendicular to the central axis of the nozzle). A height from the lower end of the aspiration nozzle to the position w is defined as a height h2.

Here, a structure of the cleaning tank 242 will be described with reference to FIG. 4. The cleaning tank 242 is provided with an upper discharge unit 401 that discharges the overflowed cleaning water, a lower discharge unit 402 that discharges the cleaning water from a lower part of the cleaning tank 242, and a spatula-shaped part 403. An upper part of a side wall of the cleaning tank 242 is continuous with the upper discharge unit 401, and the upper part of the side wall is continuous with the spatula-shaped part 403 on a side facing the upper discharge unit 401. Further, the lower discharge unit 402 is provided in a lower part of the side wall on the same side as the upper discharge unit 401. When the cleaning tank 242 is placed on the table 231, the upper discharge unit 401 is positioned to face the cylindrical member 302. The spatula-shaped part 403 is provided so as to project outward the cleaning tank 242, and forms a U-shaped groove 404 (a side view of the cleaning tank 242 as viewed from a direction of an arrow in FIG. 2B is shown in the drawing). The U-shaped groove 404 may be a V-shaped groove.

Figure 5:
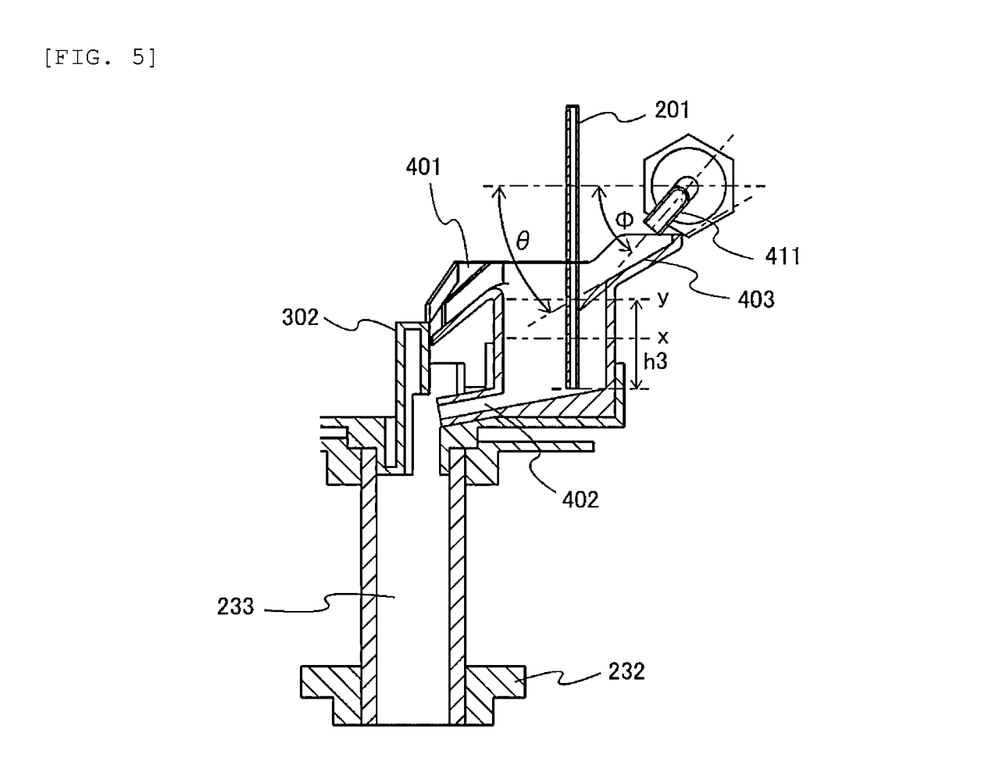
FIG. 5 is a diagram showing the cleaning operation of the aspiration nozzle.

FIG. 5 shows a case where the reservoir 230 is at a nozzle cleaning position. Here, the nozzle cleaning position refers to a position at which the table 231 can clean the aspiration nozzle 201 by inserting the aspiration nozzle 201 into the cleaning tank 242. At this time, an angle formed by an inclined part of the spatula-shaped part 403 with respect to the plane perpendicular to the central axis of the aspiration nozzle 201 is defined as θ, and an intersection point of an extension line of the inclined part of the spatula-shaped part 403 and the aspiration nozzle 201 is defined as a position y. A height from the lower end of the aspiration nozzle to the position y is defined as a height h3. Here, the angle θ<the angle φ, and the height h3>the height h1. Accordingly, even when the angle at which the cleaning water is discharged to the aspiration nozzle 201 is larger than the original angle φ for some reason, the cleaning water discharged from the cleaning water discharge port 411 is guided to the aspiration nozzle 201 by the spatula-shaped part 403, and the cleaning water hits the intersection point y, so that the cleaning liquid can be reliably applied to a region (height h1) needed to be cleaned. Further, as shown in FIG. 5, when the reservoir 230 is in the nozzle cleaning position, the spatula-shaped part 403 of the cleaning tank 242 is positioned vertically below the cleaning water discharge port 411.

Figure 6:
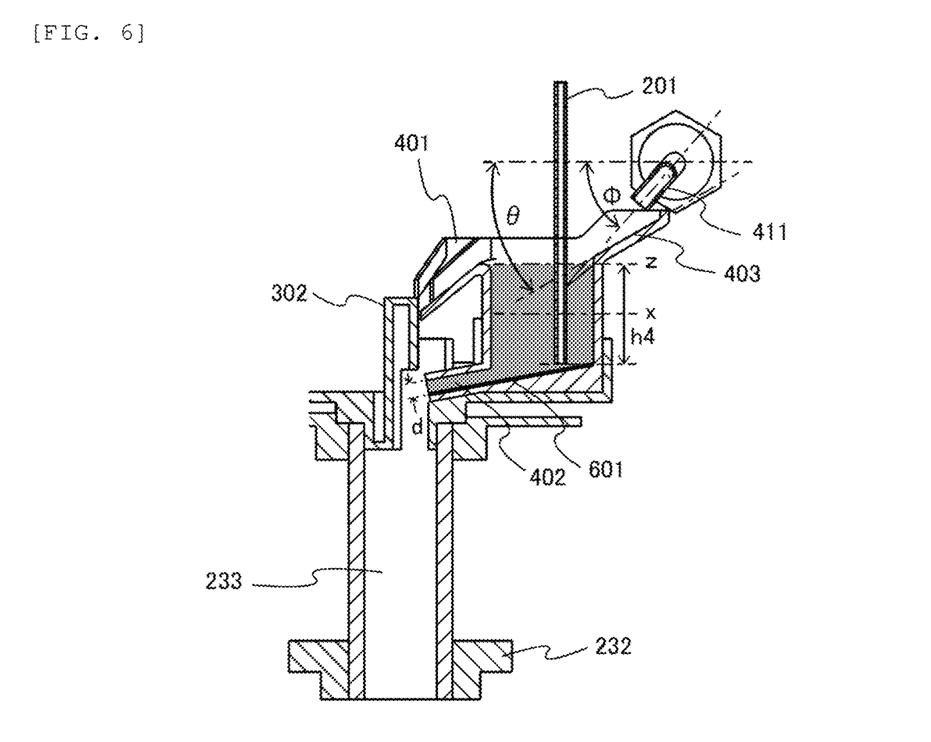
FIG. 6 is a diagram showing the cleaning operation of the aspiration nozzle.

Further, in the structure of the cleaning tank of the present embodiment, since the cleaning water is discharged to the aspiration nozzle 201 only from one direction, a surface opposite to the cleaning water discharge port 411 may be difficult to clean. Therefore, in the cleaning tank of the present embodiment, the aspiration nozzle 201 can be immersed in the cleaning water and cleaned. This state is shown in FIG. 6. When the cleaning water is continuously discharged from the cleaning water discharge port 411 in the state of FIG. 5, the cleaning water cannot be completely discharged from the lower discharge unit 402 whose flow rate of discharged water is adjusted by an inner diameter d of the lower discharge unit 402 and an inclined bottom surface 601 continuous with the lower discharge unit 402, the cleaning tank 242 is filled with the cleaning water, and the cleaning water overflows from the upper discharge unit 401. When a height of an overflow surface z determined by the upper discharge unit 401 when the reservoir 230 is at the nozzle cleaning position from the lower end of the aspiration nozzle is defined as a height h4, the height h4>the height h1. In this way, a volume of the cleaning water discharged from the cleaning water discharge port 411 per unit time is defined as a volume of the cleaning water stored in the cleaning tank 242 that overflows from the upper discharge unit 401, and the aspiration nozzle 201 is temporarily immersed in the cleaning water stored in the cleaning tank 242, so that the surface of the aspiration nozzle 201 on the side opposite to the cleaning water discharge port 411 can also be sufficiently cleaned.

Figure 7:
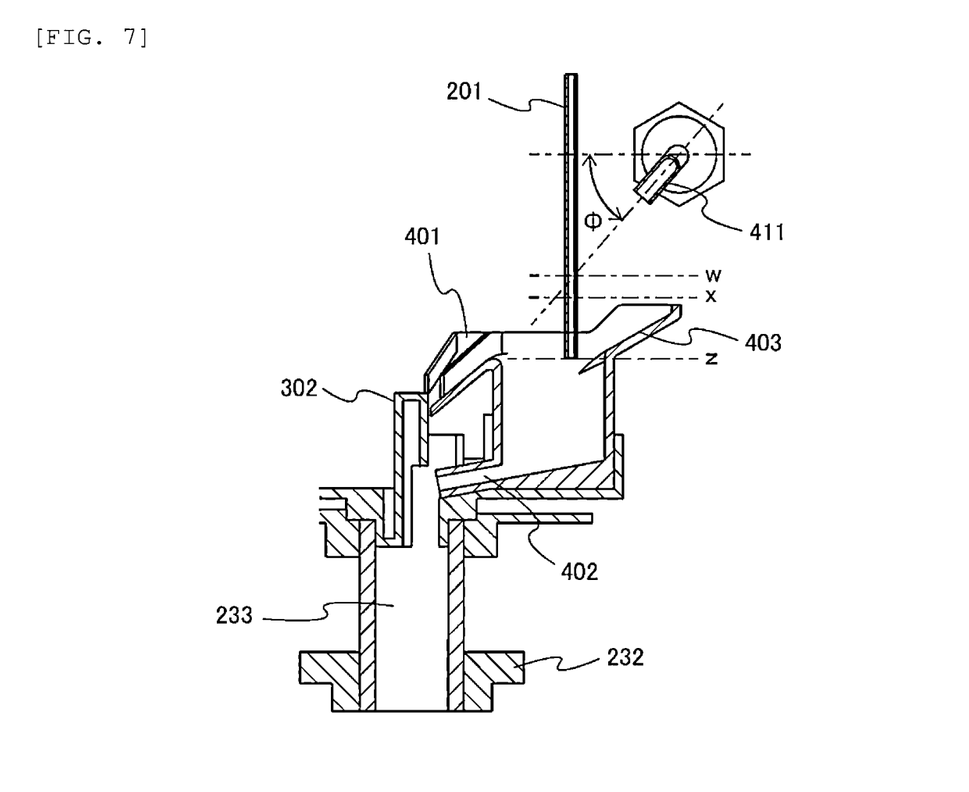
FIG. 7 is a diagram showing the cleaning operation of the aspiration nozzle.

Cleaning end operation of the aspiration nozzle 201 will be described with reference to FIG. 7. In order to improve throughput of the automatic analyzer, it is preferable to shorten a cleaning time. If the cleaning time is short, the reaction liquid adhering to the aspiration nozzle 201 may still remain in the cleaning water in the cleaning tank 242. Therefore, it is desirable to continue to discharge the cleaning water from the cleaning water discharge port 411 even while the table 231 is moved downward and the immersed aspiration nozzle 201 is separated from the cleaning water in the cleaning tank 242. Here, the height h2 of the intersection point w>the height h1. In this way, by continuing to discharge the cleaning water from the cleaning water discharge port 411 until the aspiration nozzle 201 leaves the overflow surface z of the cleaning tank 242, the aspiration nozzle 201 can be continuously cleaned with the cleaning water having no risk that the reaction liquid remains, and a risk of contamination can be further reduced.

REFERENCE SIGN LIST 100 analyzer
101 rack
102 sample container
103 sample dispensing nozzle
104 incubator
105 reaction vessel
106 transport mechanism
107 holding member
108 reaction vessel stirring mechanism
109 waste hole
110 sample dispensing tip mounting position
111 reagent disk
112 reagent disk cover
113 reagent disk cover opening
114 reagent dispensing nozzle
115 reaction vessel transport mechanism
116 detection unit
117 rack transport line
120 rack transport unit
121 power-on instruction unit
122 power-off instruction unit
123 control computer
201 aspiration nozzle
202 flow cell detector
203 syringe
204 system water supply pump
205 drain flow path
206 drain tank
210 first valve
211 branching unit
214 second valve
217 atmosphere opening part
230 reservoir
231 table
232 table driving mechanism
233 flow path
240 supply port
234 reaction vessel holding unit
235 special cleaning liquid container installation unit
241 liquid container
242 cleaning tank
301 discharge unit
302 cylindrical member
401 upper discharge unit
402 lower discharge unit
403 spatula-shaped part
404 U-shaped groove
411 cleaning water discharge port
601 inclined bottom surface

The invention claimed is:

1. An automatic analyzer, comprising:
a flow cell detector;
a nozzle that is connected to the flow cell detector by a flow path and aspirates or discharges liquid;
a reservoir that is provided with a table and a table driving mechanism that rotates the table or moves the table up and down; and
a cleaning tank that is disposed on the table, wherein
a position of the nozzle is fixed, and a cleaning water discharge port that discharges cleaning water used for cleaning the nozzle is fixed such that the cleaning water can be discharged at an angle φ with respect to a plane perpendicular to a central axis of the nozzle, and
an upper part of a side wall of the cleaning tank is continuous with an upper discharge unit at a side facing a discharge outlet provided in the reservoir and a spatula-shaped part that projects outward the cleaning tank at a side facing the upper discharge unit.

2. The automatic analyzer according to claim 1, wherein the spatula-shaped part includes an inclined part at an angle θ with respect to the plane perpendicular to the central axis of the nozzle, and
the angle φ>the angle θ.

3. The automatic analyzer according to claim 2, wherein the spatula-shaped part includes a U-shaped or V-shaped groove in which the inclined part serves as a bottom of the groove.

4. The automatic analyzer according to claim 2, wherein the reservoir includes a reaction vessel holding unit, and in a case where a range of contacting with reaction liquid is set as a range at a height h1 from a lower end of the nozzle when the nozzle aspirates the reaction liquid from a reaction vessel that is placed in the reaction vessel holding unit, and a height h3 is set as a height from the lower end of the nozzle to an intersection point between the nozzle and an extension line of the inclined part of the spatula-shaped part when the reservoir is in a nozzle cleaning position where the nozzle is cleaned by being inserted into the cleaning tank, the height h3>the height h1.

5. The automatic analyzer according to claim 1, wherein a lower part of the side wall of the cleaning tank is provided with a lower discharge unit at the side facing the discharge outlet provided in the reservoir, and a bottom surface of the cleaning tank that is continuous with the lower discharge unit is inclined to the plane perpendicular to the central axis of the nozzle.

6. The automatic analyzer according to claim 5, wherein a volume of the cleaning water discharged from the cleaning water discharge port per unit time is a volume of cleaning water stored in the cleaning tank that overflows from the upper discharge unit.

7. The automatic analyzer according to claim 1, wherein the spatula-shaped part of the cleaning tank is positioned vertically below the cleaning water discharge port when the reservoir is in a nozzle cleaning position where the nozzle is cleaned by being inserted into the cleaning tank.

8. The automatic analyzer according to claim 7, wherein the reservoir includes a reaction vessel holding unit, and in a case where a range of contacting with reaction liquid is set as a range at a height h1 from a lower end of the nozzle when the nozzle aspirates the reaction liquid from a reaction vessel that is placed in the reaction vessel holding unit, and an overflow surface of the cleaning tank is at a height h4 from the lower end of the nozzle when the reservoir is in the nozzle cleaning position, the height h4>the height h1.

9. The automatic analyzer according to claim 1, wherein the reservoir includes a reaction vessel holding unit, and in a case where a range of contacting with reaction liquid is set as a range at a height h1 from a lower end of the nozzle when the nozzle aspirates the reaction liquid from a reaction vessel that is placed in the reaction vessel holding unit, and a height h2 is set as a height from the lower end of the nozzle to an intersection point between the nozzle and an imaginary line that extends from the cleaning water discharge port at the angle φ with respect to the plane perpendicular to the central axis of the nozzle, the height h2>the height h1.

10. The automatic analyzer according to claim 1, further comprising:
a liquid container disposed on the table, wherein
a supply port that supplies liquid to the liquid container is fixed, and the reservoir moves the liquid container to match the supply port.

11. The automatic analyzer according to claim 10, wherein
an upper part of a side wall of the liquid container is continuous with a discharge unit at a side facing the discharge outlet provided in the reservoir.

12. The automatic analyzer according to claim 11, wherein
discharged liquid that overflows from the upper discharge unit of the cleaning tank or the discharge unit of the liquid container is discharged from a flow path that is continuous with the discharge outlet, and the flow path is provided along a central axis of the table driving mechanism.

13. The automatic analyzer according to claim 12, wherein
the discharge outlet of the reservoir includes a cylindrical member that faces the upper discharge unit of the cleaning tank and the discharge unit of the liquid container.

* * * * *